(12) United States Patent
Eguchi et al.

(10) Patent No.: US 6,335,573 B1
(45) Date of Patent: Jan. 1, 2002

(54) ENGINE CONTROL APPARATUS

(75) Inventors: Takahiro Eguchi; Atsushi Izumiura, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/629,981

(22) Filed: Jul. 31, 2000

(30) Foreign Application Priority Data

Aug. 2, 1999 (JP) .................................................. 11-219359

(51) Int. Cl.⁷ ...................................................... F02N 11/06
(52) U.S. Cl. ...................... 290/40 C; 290/40 R; 477/107
(58) Field of Search ............................. 290/40 C, 40 R, 290/40 A, 17; 180/65.2, 65.4; 477/107, 112, 181; 123/179.3, 179.4

(56) References Cited

U.S. PATENT DOCUMENTS

| 4,402,286 A | * | 9/1983 | Pagel et al. ............... 123/179.3 |
| 4,500,794 A | * | 2/1985 | Hamano et al. ............ 290/38 C |
| 4,510,396 A | * | 4/1985 | Uchida et al. ............. 290/30 R |
| 5,385,515 A | * | 1/1995 | Chan et al. ..................... 477/75 |
| 5,415,604 A | * | 5/1995 | Bates et al. ..................... 477/78 |
| 6,018,198 A | * | 1/2000 | Tsuzuki et al. ................. 290/17 |
| 6,093,974 A | * | 7/2000 | Tabata et al. ............... 290/40 R |
| 6,190,284 B1 | * | 2/2001 | Kuroda et al. ............... 477/107 |
| 6,202,776 B1 | * | 3/2001 | Masberg et al. ............ 180/65.2 |

FOREIGN PATENT DOCUMENTS

| JP | 8-317505 | 11/1996 |
| JP | 10122008 | * 5/1998 |

* cited by examiner

Primary Examiner—Joseph Waks
(74) Attorney, Agent, or Firm—Armstrong, Westerman, Hattori, McLeland & Naughton, LLP

(57) ABSTRACT

An engine control apparatus is provided for a hybrid vehicle that installs an engine and a motor as driving power sources for driving wheels as well as an automatic transmission such as CVT. The engine control apparatus basically operates to enable automatic stop and restart of the engine in response to drive conditions of the vehicle. In addition, the engine control apparatus cuts off fuel supply to the engine at a deceleration mode of the vehicle. At a deceleration mode of the vehicle under execution of fuel cut, the engine control apparatus maintains idle rotation of the engine by operating the motor to rotate in response to engine speed until the automatic transmission is returned to a restart-enable reduction ratio (e.g., 2.2 to 2.45). That is, the engine control apparatus allows execution of an engine stop after securing a restart-enable state of the automatic transmission. Incidentally, the motor produces motor torque, which is increased in response to decrease of the engine speed in a range between 700 and 1000 rpm, then, which is maintained at a prescribed value (e.g., 8.5 kgf-m), for example.

5 Claims, 9 Drawing Sheets

ENGINE CONTROL APPARATUS

BACKGROUND OF THE INVENTION

1. Field of the Invention

This invention relates to engine control apparatuses that control engines of hybrid vehicles, and particularly to engine control apparatuses that stop and restart the engines as well as cut off fuel supply to the engines in hybrid vehicles installing automatic transmissions.

This application is based on Patent Application No. Hei 11-219359 filed in Japan, the content of which is incorporated herein by reference.

2. Description of the Related Art

Conventionally, hybrid vehicles are well known to install electric motors in addition to engines as driving sources. Generally, the hybrid vehicles are classified into two types of vehicles, namely, series hybrid vehicles and parallel hybrid vehicles. The series hybrid vehicles are designed to drive wheels by electric motors, which are driven by electric power generated by generators being driven by engines. The parallel hybrid vehicles are designed such that electric motors (or drive assist motors) are directly coupled to engines and assist to drive shafts of the engines. In addition, the parallel hybrid vehicles are equipped with generators, which are provided independently of the motors or which are actualized by the drive assist motors. So, electric energy generated by the aforementioned generators is accumulated in battery devices of the parallel hybrid vehicles.

The aforementioned hybrid vehicles are capable of running the engines with substantially constant engine speeds within prescribed engine speed zones realizing high fuel efficiency and low emission. Therefore, as compared with the conventional vehicles using only internal-combustion engines, the hybrid vehicles are capable of realizing good fuel efficiency and low emission in discharge gas.

Some of the hybrid vehicles (disclosed by Japanese Unexamined Patent Publication No. Hei 8-317505, for example) are designed to allow engine operations to be stopped under prescribed drive conditions.

The hybrid vehicles are capable of running in three modes, namely, an engine running mode, a motor running mode and an engine-and-motor running mode, in response to drive conditions thereof. So, the hybrid vehicles are superior in some advantages to cope with the drive conditions (e.g., stop conditions). For example, it is possible to avoid overcharge of batteries by automatically stopping engine operations, or it is possible to further improve fuel efficiency by adequately selecting the running modes. However, the hybrid vehicles suffer from the following problems.

That is, the hybrid vehicles employ automatic transmissions such as continuously variable transmissions (CVTs), oil pressures of which are secured by engine outputs. So, when the hybrid vehicles stop the engines without preparation of the automatic transmissions in starting, the automatic transmissions simultaneously loose controls thereof. Thus, the vehicles must be started with certain reduction ratios of the automatic transmissions which are established at engine stops, so that acceleration become slow (or dull). In addition, it takes a long time to accomplish perfect engagement of starting clutches. In that case, the hybrid vehicles suffer from a problem in that fuel efficiency is deteriorated.

Further, because a certain oil pressure is needed to restore a reduction ratio enabling start of the vehicle, lubrication shortage occurs on the starting clutch. Furthermore, there is a probability in that hydraulic pressure and lubrication cannot be sufficiently supplied to parts of the CVT.

SUMMARY OF THE INVENTION

It is an object of this invention to provide an engine control apparatus that is capable of stopping an engine of a hybrid vehicle after standby for waiting a start implementing condition to be established.

According to a first aspect of the invention, an engine control apparatus is applied to a vehicle in which wheels are driven by driving power being produced by an engine and transmitted by an automatic transmission (e.g., CVT). Herein, the engine control apparatus basically operates to enable automatic stop and restart of the engine in response to prescribed drive conditions of the vehicle. In addition, the engine control apparatus cuts off fuel supply to the engine at a deceleration mode of the vehicle. By detecting that the automatic transmission returns its reduction ratio to a restart-enable reduction ratio, the engine control apparatus allows execution of an engine stop. Thus, it is possible to prevent the engine stop from being executed before the automatic transmission is returned to the restart-enable reduction ratio.

According to a second aspect of the invention, an engine control apparatus is applied to a hybrid vehicle which installs an engine and a motor as driving power sources for driving wheels. The engine control apparatus basically operates to enable automatic stop and restart of the engine in response to prescribed drive conditions of the hybrid vehicle. In addition, the engine control apparatus cuts off fuel supply to the engine at a deceleration mode of the hybrid vehicle. Further, the engine control apparatus is equipped with a detector for detecting engine speed of the engine and a detector for detecting a reduction ratio of an automatic transmission (e.g., CVT). Herein, the reduction ratio is detected by calculating a ratio between an engine rotation speed and an output shaft rotation speed, for example. Furthermore, the engine control apparatus maintains an idle rotation speed of the engine by controlling the motor to rotate in response to the engine speed under execution of fuel cut at the deceleration mode until the automatic transmission is returned to a restart-enable reduction ratio. Thus, it is possible to prevent an engine stop from being executed before the automatic transmission is returned to the restart-enable reduction ratio under execution of the fuel cut at the deceleration mode. In addition, the vehicle does not restart after the engine stop with an extremely low reduction ratio of the automatic transmission, so it is possible to produce appropriate acceleration. Since the automatic transmission has been already returned to the restart-enable reduction ratio before restarting, it is possible to use hydraulic pressure of the automatic transmission exclusively for restarting the vehicle. So, it is possible to avoid occurrence of an unwanted situation where hydraulic pressure and lubrication are not sufficiently supplied to parts of the CVT.

According to a third aspect of the invention, the engine control apparatus controls the motor such that motor torque is increased in response to decrease of the engine speed when maintaining the idle rotation of the engine. So, it is possible to eliminate a feeling of wrongness for the driver when the motor torque is produced.

BRIEF DESCRIPTION OF THE DRAWINGS

These and other objects, aspects and embodiment of the present invention will be described in more detail with reference to the following drawing figures, of which.

DESCRIPTION OF THE PREFERRED EMBODIMENT

This invention will be described in further detail by way of examples with reference to the accompanying drawings.

Figure 1:
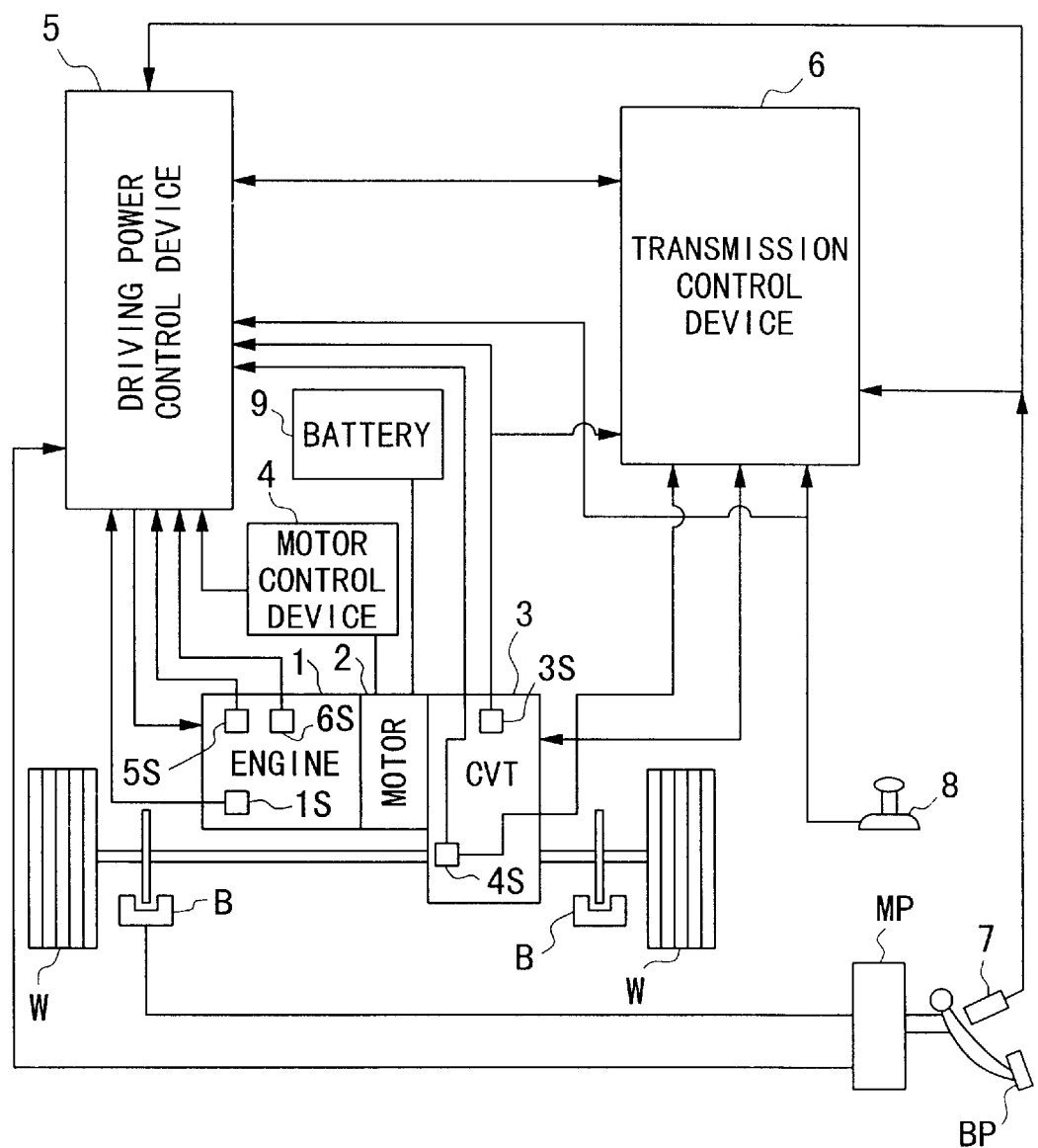
FIG. 1 is a block diagram showing a configuration of an engine control apparatus of a hybrid vehicle installing an engine and a motor in accordance with preferred embodiment of the invention.

FIG. 1 shows a configuration of an engine control apparatus of a hybrid vehicle in accordance with an embodiment of the invention. In FIG. 1, a reference numeral 1 designates an internal-combustion engine, which will be simply referred to as an engine. A reference numeral 2 designates an electric motor, which will be simply referred to as a motor. The motor 2 assists the engine 1 to produce power in response to drive conditions of the vehicle. At a deceleration mode of the vehicle, the motor 2 performs regeneration of driving power. A reference numeral 3 designates a belt-type continuously variable transmission, which will be simply referred to as a CVT. The CVT 3 is realized by an automatic transmission of a torque converter type, for example. Concretely speaking, the CVT 3 contains a forward/backward changeover mechanism, a gear shift mechanism and a differential gear as well as a clutch or torque converter.

The present embodiment is designed to exclusively use the CVT as the transmission. A reference numeral 4 designates a motor control device that controls rotations of the motor 2. A reference numeral 5 designates a driving power control device that controls rotations of the engine 1 and rotations of the motor 2 by way of the motor control device 4. A reference numeral 6 designates a transmission control device that controls the CVT 3. A reference numeral 7 designates a brake switch that performs detection as to whether a driver steps on a brake pedal BP by his/her foot or not. So, the brake switch 7 outputs to the transmission control device 6 and the driving power control device 5 a signal identifying a state of a brake B which is ON or OFF.

A reference numeral 8 designates a position switch used for determination of shift ranges. The position switch 8 corresponds to at least four shift positions, namely, a parking (P) range, a reverse (R) range, a neutral (N) range and a drive (D) range. Thus, the position switch 8 outputs to the transmission control device 6 and the driving power control device 5 signals identifying the shift positions respectively. A reference numeral 9 designates a battery, which supplies electric power to the motor 2 to drive and which stores electric power being regenerated by the motor 2.

A reference symbol 1S designates an engine speed sensor that detects an engine speed of the engine 1. A reference symbol 3S designates an output shaft rotation speed sensor that detects a rotation speed of a rotation shaft coupled to a pulley being arranged in a follower side of the CVT 3. A reduction ratio of the CVT 3 is calculated by (arithmetic) operations based on an output of the engine speed sensor 1S and an output of the output shaft rotation speed sensor 3S. Herein, the reduction ratio is a ratio in comparison between an input rotation speed and an output rotation speed. It is possible to express "(reduction ratio)=(input rotation speed)/(output rotation speed)". A reference symbol 4S designates a speed sensor that detects running speed of the vehicle based on rotation speed of a drive wheel W. Using an output of the speed sensor 4S, the driving power control device 5 and the transmission control device 6 calculate running speed of the vehicle. In addition, they produce acceleration of the vehicle by calculations being effected on variations of the running speed of the vehicle. A reference symbol 5S designates a water temperature sensor that detects water temperature of cooling water of the engine 1. A reference symbol 6S designates a throttle opening sensor that detects a degree of throttle opening of the engine 1.

Figure 10:
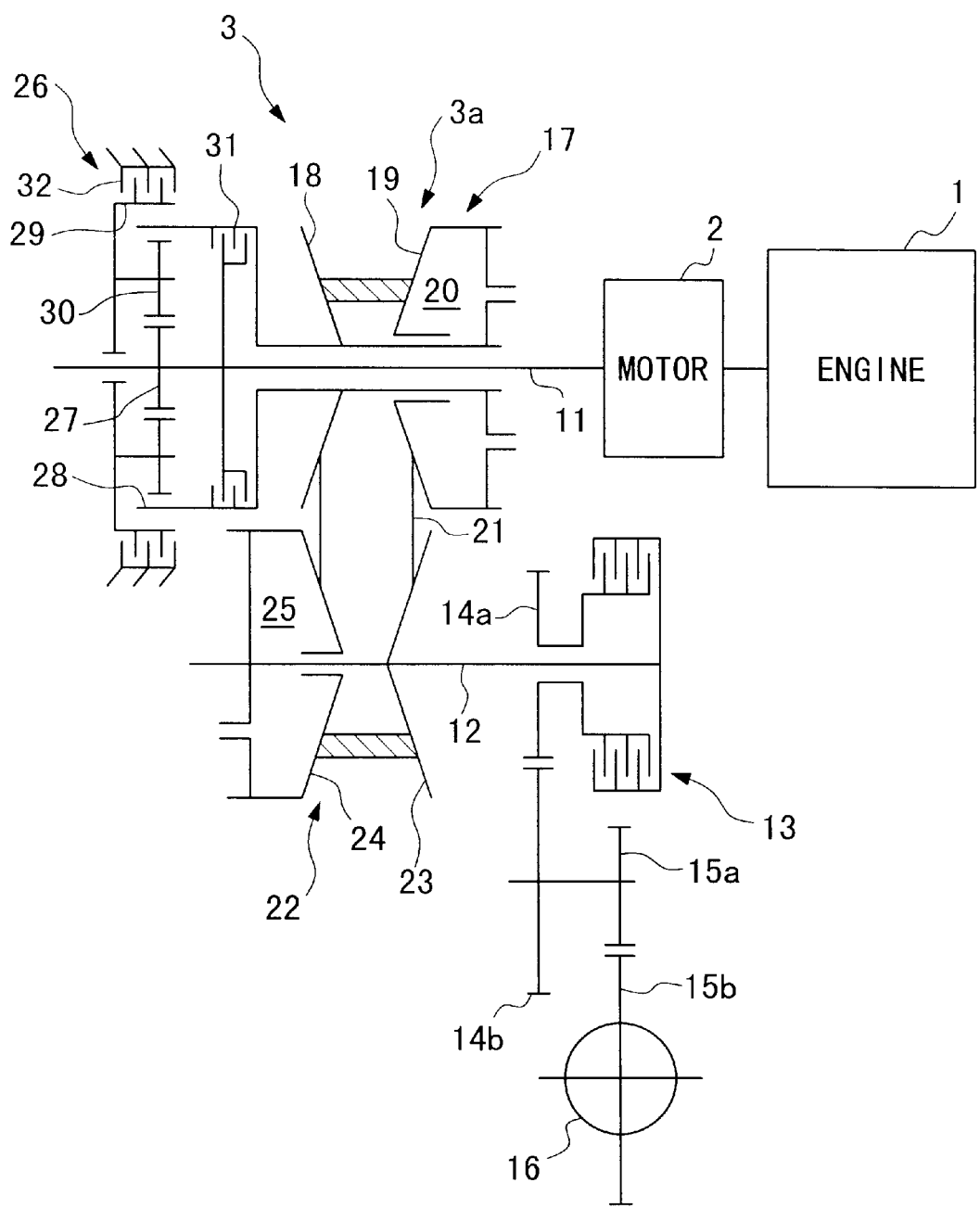
FIG. 10 is a schematic diagram diagrammatically showing a construction of a CVT shown in FIG. 1.

Next, an example of a construction of the CVT 3 shown in FIG. 1 will be described with reference to FIG. 10. FIG. 10 is a schematic diagram diagrammatically showing the construction of the CVT 3. In FIG. 10, a reference numeral 11 designates an input shaft which is directly coupled to the engine 1 and the motor 2. A reference numeral 12 designates a counter shaft to which rotation of the input shaft 11 is transmitted by means of a belt-type CVT 3a. The aforementioned reduction ratio is a ratio in comparison between a rotation speed (i.e., input rotation speed) of the input shaft 11 and a rotation speed (i.e., output rotation speed) of the counter shaft 12. A reference numeral 13 designates a starting clutch which performs or cuts off transmission of rotation of the counter shaft 12 to the drive wheel W. Reference numerals 14a, 14b, 15a and 15b designate power transmission gears. A reference numeral 16 designates a differential gear.

A reference numeral 17 designates a drive pulley which is constructed by a drive-side fixed pulley 18, a drive-side moving pulley 19 and a drive-side cylinder. A reference numeral 21 designates a V belt. A reference numeral 22 designates a follower pulley which is constructed by a follower-side fixed pulley 23, a follower-side moving pulley 24 and a follower-side cylinder 25. A reference numeral 26 designates a forward/backward changeover mechanism which is constructed by a sun gear 27, a ring gear 28, a carrier 29, a pinion gear 30, a forward clutch 31 and a backward brake 32.

Next, operations of the CVT 3 will be simply described with reference to FIG. 10. First, the input shaft 11 directly coupled to the engine 1 and the motor 2 rotates, so that the drive pulley 17 correspondingly rotates. Herein, a rotation direction of the drive pulley 17 depends upon a shift position corresponding to the position switch 8. In the case of the D range, for example, the forward clutch 31 is ON and the backward brake 32 is simultaneously OFF, so that the drive pulley 17 rotates in a forward direction. In the case of the R range, the forward clutch 31 is OFF and the backward brake 32 is simultaneously ON, so that the drive pulley 17 rotates in a backward direction.

Rotation of the drive pulley 17 is transmitted to the follower pulley 22 by the V belt 21. Rotation of the follower pulley 22 is further transmitted to the starting clutch 13 by the counter shaft 12. In response to the starting clutch 13 which is turned ON or OFF, the drive wheel W rotates in a forward or backward direction.

A reduction ratio of the CVT 3 is changed by changing a pulley ratio between the drive pulley 17 and the follower pulley 21, wherein operating oil is flown into the drive-side cylinder 20 and the follower-side cylinder 25. Herein, the pulley ratio is changed by the drive-side moving pulley 19 and the follower-side moving pulley 24 which slide on the input shaft 11 and the counter shaft 12 respectively.

As described above, the CVT 3 shown in FIG. 1 is designed such that the starting clutch 13 is arranged in the follower side. Hence, it is possible to change the reduction ratio of the belt-type CVT 3a even when the vehicle is stopped but the engine 1 is started.

Figure 9:
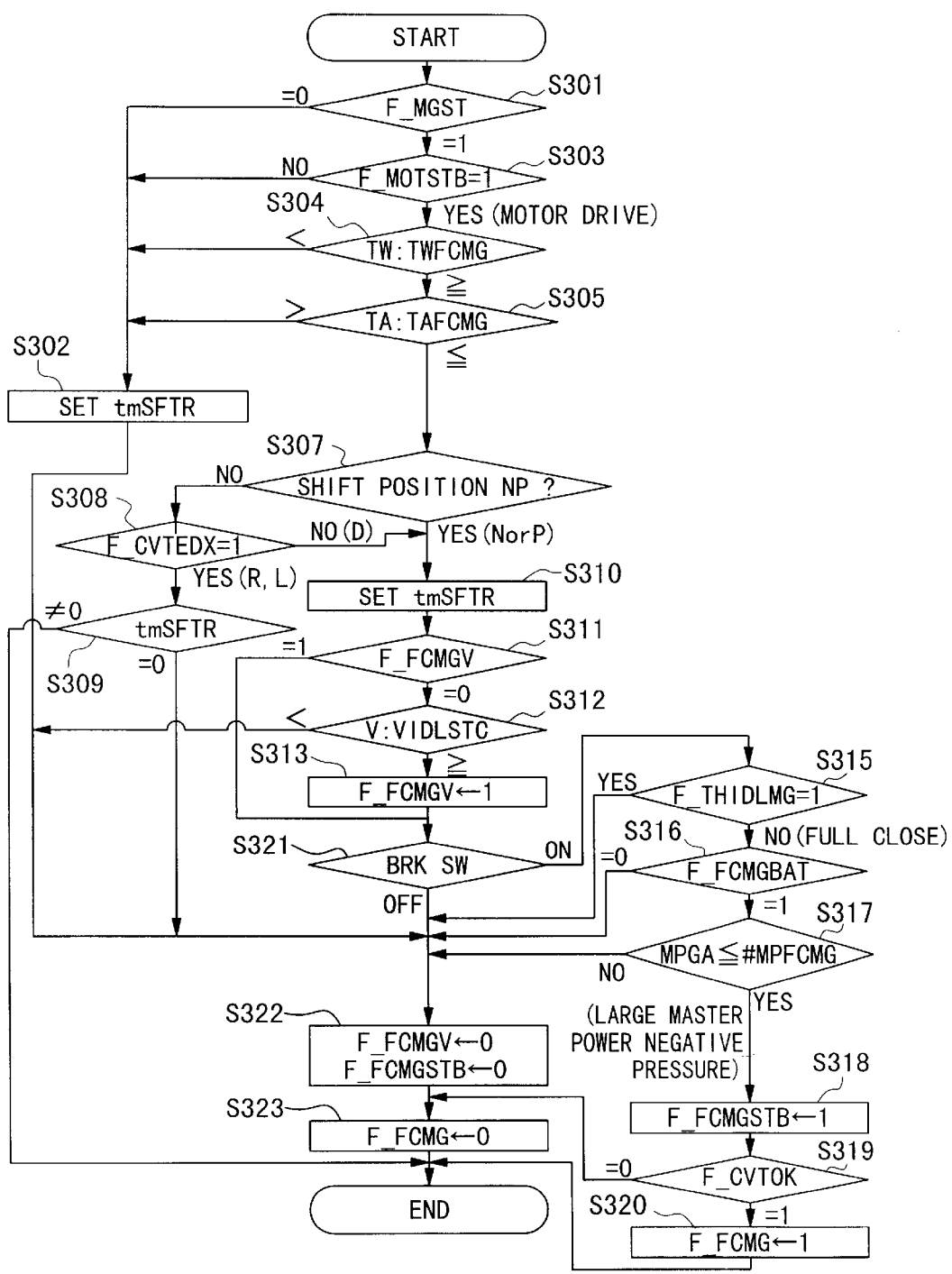
FIG. 9 is a flowchart showing an engine stop determination process being executed by a driving power control device shown in FIG. 1.

The driving power control device 1 performs stop and restart operations of the engine 1, which will be simply described with reference to FIG. 9. FIG. 9 shows a control flow with regard to an engine stop determination process, which is executed by the driving power control device 5 (hereinafter, simply referred to as the device).

In step S301, a decision is made as to whether a start switch ON start execution flag F__MGST is set to "0" or "1". If the start switch ON start execution flag F__MGST is "0", in other words, if the device determines that the vehicle carries out a first run, the flow proceeds to step S302 in which a shift range change stabilization wait timer tmSFTR is set. In step S322, a flag F__FCMGV indicating whether running speed of the vehicle exceeds a prescribed speed after activation of a starter or not is set to "0", and an engine stop preparation completion flag F__FCMGSTB to the CVT 3 is set to "0". In step S323, an engine stop control execution flag F__FCMG is set to "0". Then, the flow ends the process. Herein, setting the flag F__FCMGV to "0" indicates that the running speed of the vehicle does not exceed the prescribed speed after the activation of the starter. In addition, setting the flag F__FCMGSB to "0" informs the CVT 3 that an engine stop preparation is not completed.

If the step S301 determines that the start switch ON start execution flag F__MGST is "1", in other words, if the device determines that this is not the first run of the vehicle, the flow proceeds to step S303 in which a decision is made as to whether a communication information flag F__MOTSTB given from the motor control device 4 is set to "1" or not. When the communication information flag F__MOTSTB is "1", the motor control device 4 declares that the engine 1 can be started by the motor 2. If "0", the engine 1 cannot be started by the motor 2.

If the step S303 determines that the communication information flag F__MOTSTB given from the motor control device 4 is "1", the flow proceeds to step S304 in which comparison is made between water temperature TW of the engine 1 and lower-limit water temperature TWFCMG implementing an engine stop.

If the step S304 determines that the water temperature TW is lower than the lower-limit water temperature TWFCMG, the flow proceeds to step S302. Thus, the device does not execute the engine stop when the engine 1 is not placed in a warming-up condition. If the step S304 determines that the water temperature TW is equal to or above the lower-limit water temperature TWFCMG implementing the engine stop, the flow proceeds to step S305 in which comparison is made between intake air temperature TA of the engine 1 and upper-limit intake air temperature TAFCMG implementing an engine stop.

If the step S305 determines that the intake air temperature TA is higher than the upper-limit intake air temperature TAFCMG implementing the engine stop, the flow proceeds to step S302. Thus, if the intake air temperature is high, the device does not perform the engine stop in order to cope with deterioration of starting performance of the vehicle and secure desired performance of an air conditioner (not shown). If the step S305 determines that the intake air temperature TA is under the upper-limit intake air temperature TAFAMG implementing the engine stop, the flow proceeds to step S307.

In step S307, a decision is made as to whether the shift position of the position switch 8 is either the neutral (N) range or parking (P) range or not.

If the step S307 determines that the shift range is other than the N range and P range, the flow proceeds to step S308 in which a decision is made as to whether a drive range determination flag F__CVTEDX is set to "1" or not. If the drive range determination flag F__CVTEDX is "1", it is indicated that the shift range corresponds to the D range. If "1", it is indicated that the shift range corresponds to the R range or else.

Therefore, if the step S308 determines that the drive range determination flag F__CVTEDX is "0", the flow proceeds to step S310 in order to execute an engine stop. If the step S308 determines that the drive range determination flag F__CVTEDX is "1", the flow proceeds to step S309 in which a decision is made as to whether the shift range change stabilization wait timer tmSFTR is set to "0" or not. If the step S309 determines that the shift range change stabilization wait timer tmSFTR is "0", the flow proceeds to step S322. If the shift range change stabilization wait timer tmSFTR is not equal to "0", the device ends the process.

The shift range change stabilization wait timer tmSFTR is provided not to reduce a frequency of executing the engine stop which is released when a shift lever temporarily passes through the R range between the D range and P range.

If the step S307 determines that the shift range corresponds to either the N range or P range, the flow proceeds to step S310 in which the shift range change stabilization wait timer tmSFTR is set to execute an engine stop.

In step S311, a decision is made as to whether the flag F__FCMGV is set to "0" or "1". The flag F__FCMGV indicates whether running speed of the vehicle exceeds a prescribed speed after activation of the starter.

If the step S311 determines that the flag F FCMGV is set to "0", the flow proceeds to step S312 in which running speed V of the vehicle is compared with a reference speed VIDLSTC (e.g., 15 km/h), which is used for determination whether to execute an engine stop at a low running speed mode of the vehicle.

If the step S312 determines that the running speed V is lower than the aforementioned reference speed VIDLSTC, the flow proceeds to step S322. In contrast, if the step S312 determines that the running speed V is equal to or above the reference speed VIDLSTC, the flow proceeds to step S313 in which the flag F__FCMGV is set to "1". Herein, this flag is used for determination as to whether the running speed exceeds the prescribed speed after restart of the vehicle or not.

In step S322, flags F__FCMGV and F__FCMGSTB are both initialized by a restart of the vehicle after the engine stop. Due to the aforementioned steps S311, S312 and S313, the initialized flags are not set to "1" until the running speed V exceeds the reference speed VIDLSTC. That is, once the vehicle is restarted, the device does not allow execution of an engine stop until the running speed exceeds the aforementioned reference speed.

The aforementioned controls are provided to cope with repetition of stop-and-restart operations, which may be frequently repeated in the case of the congestion, temporary stop and restart. So, the device inhibits an engine stop from being executed again until the vehicle runs a certain distance or the vehicle runs for a certain time after restart.

In step S321, a decision is made as to whether the brake switch 7 is ON or OFF. If the step S321 determines that the brake switch 7 is ON, the flow proceeds to step S315 in which a flag F_THIDLMG indicating whether a throttle (not shown) is full close is set to "1" or not. If the flag F_THIDLMG is "1", in other words, if the step S315 determines that the throttle is not full close, the flow proceeds to step S322, so that the device does not allow execution of an engine stop. If the flag F_THIDLMG is "0", in other words, if the step S315 determines that the throttle is full close, the flow proceeds to step S316, which discriminates a state of a restart determination flag F_FCMGBAT due to reduction of remaining battery charge of a battery (not shown).

If the restart determination flag F_FCMGBAT becomes "0" due to reduction of the remaining battery charge, in other words, if the step S316 determines that restart of the engine is needed to cope with reduction of the remaining battery charge, the flow proceeds to step S322. In contrast, if the restart determination flag F_FCMGBAT is set to "1" regardless of reduction of the remaining battery charge, in other words, if the step S316 determines that restart of the engine is not needed regardless of reduction of the remaining battery charge, the flow proceeds to step S317.

In step S317, brake master power negative pressure MPGA of a brake master power MP is compared with an upper-limit value #MPFCMG of brake master power negative pressure that enables execution of an engine stop. Herein, they are compared together in absolute values.

If the brake master power negative pressure MPGA is under the upper-limit value #MPFCMG, in other words, if a decision result of the step S317 is "YES", the flow proceeds to step S318 so that the device allows execution of an engine stop.

If the brake master power negative pressure MPGA is higher than the upper-limit value #MPFCMG and is relatively close to the atmospheric pressure, in other words, if the decision result of the step S317 is "NO", the flow proceeds to step S322 so that the device allows restart of the engine.

Therefore, even if the negative pressure of the brake master power MP almost disappears by the pumping brake technique which is effected in an engine stop mode or during fuel cut being continued, a braking capability is secured because the device automatically restarts the engine 1 or performs restoration from the fuel cut to secure the brake master power negative pressure MPGA. As a result, it is possible to eliminate a load for the driver in depressing the brake pedal due to shortage of the brake master power negative pressure MPGA.

In step S318, the engine stop preparation completion flag F_FCMGSTB to the CVT 3 is set to "1". In step S319, a decision is made as to whether an engine stop OK flag F_CVTOK of the CVT 3 is set to "1" or "0". If the engine stop OK flag F_CVTOK of the CVT 3 is "1", in other words, if the step S319 determines that the CVT3 is ready for the engine stop, the flow proceeds to step S320 in which an engine stop control execution flag F_FCMG is set to "1". Then, the device ends the process. If the engine stop OK flag F_CVTOK of the CVT 3 is "0", in other words, if the step S319 determines that the CVT 3 is not ready for the engine stop, the flow proceeds to step S323 in which the engine stop control execution flag F_FCMG is set to "0". Then, the device ends the process.

If the step S321 determines a state of the brake switch which is OFF, the flow proceeds to step S322 in which the flag F_FCMGV indicating whether the running speed exceeds the prescribed speed after activation of the starter is set to "0", and the engine stop preparation completion flag F_FCMGSTB to the CVT 3 is set to "0". In step S323, the engine stop control execution flag F_FCMG is set to "0". Then, the device ends the process.

As described above, stop and restart of the engine 1 are implemented in accordance with the prescribed drive conditions of the vehicle.

Next, the present embodiment controls rotations of the engine 1 and motor 2 in response to conditions of the CVT 3, which will be described with reference to FIGS. 1 to 5.

When preparation is completed for engine stop, the driving power control device 5 sets the engine stop preparation completion flag F_FCMGSTB to "1", which is communicated to the transmission control device 6. Responding to it, the transmission control device 6 sets the engine stop OK flag F_CVTOK based on a present state of the CVT 3. In addition, the transmission control device 6 communicates a variable CVTOKNO including the engine stop OK flag F_CVTOK to the driving power control device 5. Then, the driving power control device 5 makes determination whether to perform the engine stop or not. Thus, the driving power control device 5 controls execution of the engine stop.

Figure 2:
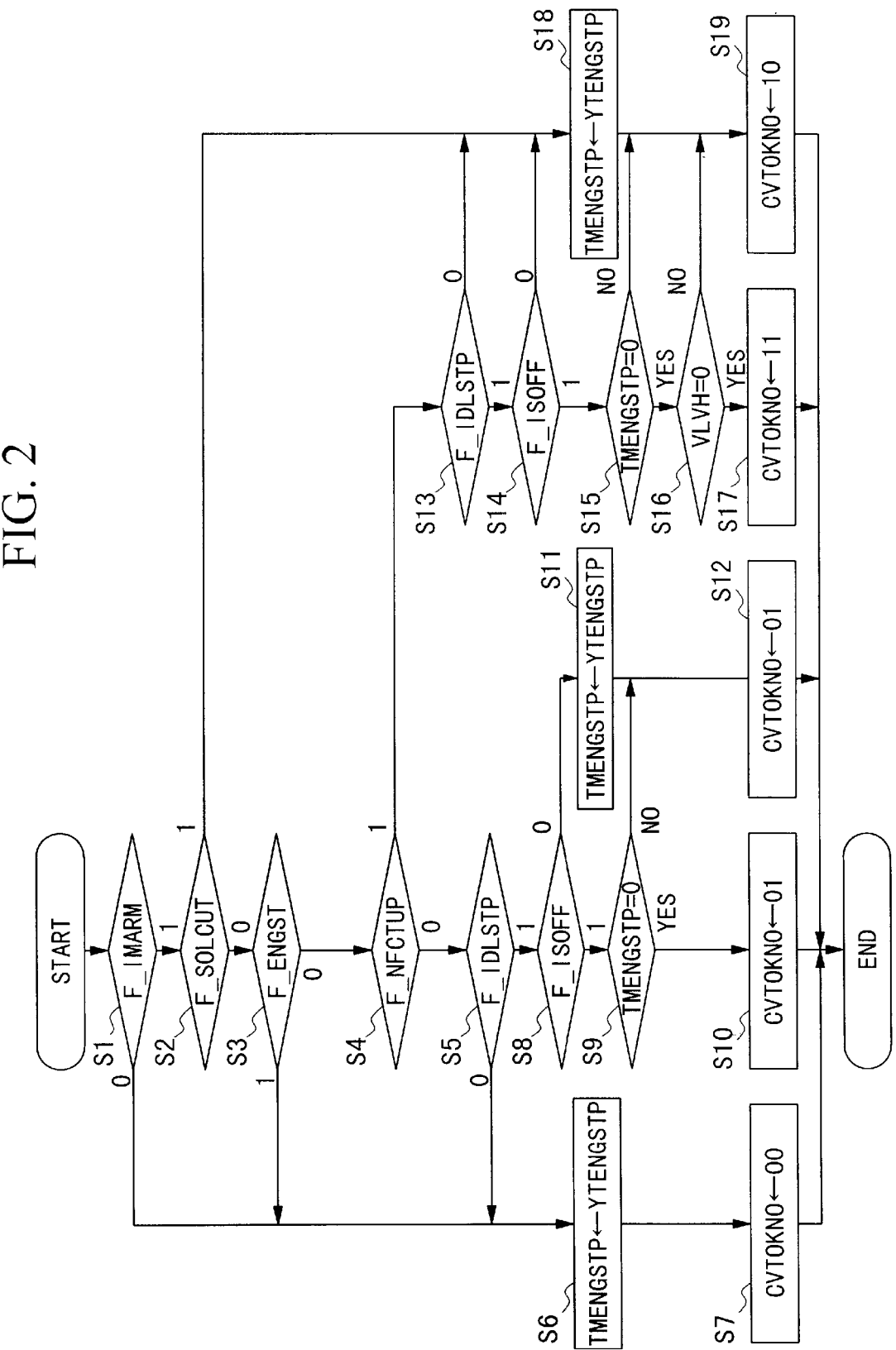
FIG. 2 is a flowchart showing a process for determination of states of a CVT by a transmission control device communicating with a driving power control device shown in FIG. 1.

Next, operations for setting the variable CVTOKNO including the engine stop OK flag F_CVTOK will be described with reference to FIG. 2. Namely, FIG. 2 shows operations of the transmission control device 6 that sets the variable CVTOKNO in response to the state of the CVT 3. The transmission control device 2 repeatedly execute the setting operations of the variable CVTOKNO by a certain interval of time. Such an interval of time is determined in advance on the basis of a time which the transmission control device 6 needs to detect the state of the CVT 3. For example, it is set to 10 milliseconds.

The variable CVTOKNO is 2-bit data, in which a high-order bit indicates whether the engine 1 is restored from fuel cut or not. If the high-order bit is set to "1", a fuel-cut-restoration rotation speed which is set for the engine being restored from the fuel cut is increased higher than a certain rotation speed which is presently set at a deceleration mode. Normally, running speed of the vehicle is reduced during the fuel cut of the engine of the vehicle which is decelerated. By the aforementioned setting of the high-order bit of the variable CVTOKNO, the vehicle is restored from the fuel cut to avoid an event in which the rotation speed of the engine becomes too low. If the high-order bit is set to "0", the fuel-cut-restoration rotation speed of the engine is maintained at a predetermined rotation speed, so that the fuel cut is substantially continued at the deceleration mode. For the reasons described above, if the vehicle does not carry out the fuel cut on the engine, the aforementioned high-order bit of the variable CVTOKNO is meaningless. Restoration from the fuel cut is made by activating fuel injection again. A low-order bit of the variable CVTOKNO corresponds to the engine stop OK flag F_CVTOK. So, the transmission control device 6 allows an engine stop if the low-order bit is "1", while it inhibits the engine stop if the low-order bit is "0".

In step S1 shown in FIG. 2, a hybrid vehicle determination flag F_IMARM is used for determination as to whether the transmission which is a subject being controlled by the transmission control device 6 is installed in a hybrid vehicle or not. If the transmission is installed in the hybrid vehicle, the hybrid vehicle determination flag F_IMARM is set to "1". If the transmission is installed in other vehicles, the hybrid vehicle determination flag F_IMARM is set to "0" in advance. Using the flag F_IMARM, it is possible to avoid a control error if the driving power control device 5 is applied to control an engine installed in a vehicle which is not the hybrid vehicle.

In step S2, a linear solenoid fail flag F_SOLCUT is used for determination as to whether a failure occurs on a control solenoid of the CVT 3 or not. The flag F_SOLCUT is set to "1" if a failure occurs on the control solenoid, while it is set to "0" if a failure does not occur on the control solenoid. Therefore, if the step S2 determines that a failure occurs on the control solenoid of the CVT 3, the flow proceeds to step S18.

If the step S2 determines that a failure does not occur on the control solenoid of the CVT 3, the flow proceeds to step S3, which makes determination as to whether the engine is started regardless of an engine stop mode or not with reference to an engine start determination flag F_ENGST. The engine start determination flag F_ENGST is set by a process, details of which will be described later. Namely, the engine 1 is started if the engine start determination flag F_ENGST is "1". So, if the step S3 determines that the engine start determination flag F_ENGST is "1", the flow proceeds to step S6.

If the engine start determination flag F_ENGST is "0", the flow proceeds to step S4, which makes determination as to whether restoration from the fuel cut is requested or not with reference to a fuel cut restoration flag F_NFCTUP. The fuel cut restoration flag F_NFCTUP is set or reset by a process, details of which will be described later. Namely, if the fuel cut restoration flag F_NFCTUP is set to "1", the fuel-cut-restoration rotation speed of the engine is increased high so that fuel injection is performed at an early timing. So, if the step S4 determines that the fuel cut restoration flag F_NFCTUP is "1", the flow proceeds to step S13.

If the step S4 determines that the fuel cut restoration flag F_NFCTUP is "0", the flow proceeds to step S5, which discriminates an engine stop determination flag F_IDLSTP. The engine stop determination flag F_IDLSTP is set or reset by a process, details of which will be described later. So, the device allows execution of an engine stop if the engine stop determination flag F_IDLSTP is "1".

If the step S5 determines that the engine stop determination flag F_IDLSTP is "0", the flow proceeds to step S6 which puts an engine stop delay timer reset value YTENGSTP into an engine stop delay timer TMENGSTP. That is, the engine stop delay timer TMENGSTP is being reset by the engine stop delay timer reset value YTENGSTP, which is set to 10 milliseconds (or 10 msec), for example. In step S7, the variable CVTOKNO is set to "00" in binary notation. Incidentally, the aforementioned delay timer sets a delay time, which is related to a hydraulic response delay on control of the starting clutch between a timing to determine isolation of the starting clutch and another timing to allow execution of an engine stop.

If the step S5 determines that the engine stop determination flag F_IDLSTP is "1", the flow proceeds to step S8, which makes determination as to whether the starting clutch is isolated or not with reference to a flag F_ISOFF. If the starting clutch is isolated, the flag F_ISOFF is set to "1". If not, the flag F_ISOFF is set to "1".

If the step S8 determines that the starting clutch is isolated, the flow proceeds to step S9 in which a decision is made as to whether the engine stop delay timer TMENGSTP is set to "0" or not. If "0", the flow proceeds to step S10 in which the variable CVTOKNO is set to "01" in binary notation. This indicates permission for an engine stop or a compulsory stop of the engine with use of the motor. In step S9, if the engine stop delay timer TMENGSTP is not set to "0", the flow proceeds to step S12.

If the step S8 determines that the starting clutch is not isolated, the flow proceeds to step S11 in which the engine stop delay time reset value YTENGSTP (e.g., 10 msec) is put into the engine stop delay timer TMENGSTP, which is being reset. Then, the flow proceeds to step S12 in which the variable CVTOKNO is set to "01" in binary notation.

If the aforementioned step S4 determines that the fuel cut control flag F_NFCTUP is set to "1", the flow proceeds to step S13, which discriminates the engine stop determination flag F_IDLSTP. The engine stop determination flag F_IDLSTP is set or reset by the process, details of which will be described later. Namely, the device allows execution of an engine stop if the engine stop determination flag F_IDLSTP is "1".

If the step S13 determines that the engine stop determination flag F_IDLSTIP is "0", the flow proceeds to step S18 in which the engine stop delay timer reset value YTENGSTP (i.e., 10 msec) is put into the engine stop delay timer TMENGSTP, which is being reset. Then, the flow proceeds to step S19 in which the variable CVTOKNO is set to "10" in binary notation.

If the step S13 determines that the engine stop determination flag F_IDLSTP is "1", the flow proceeds to step S14, which makes determination as to whether the starting clutch is isolated or not with reference to the flag F_ISOFF. If the starting clutch is isolated, the flag F_ISOFF is set to "1". If not, the flag F_ISOFF is set to "0".

If the step S14 determines that the starting clutch is not isolated, the flow proceeds to step S18 in which the engine stop delay timer reset value YTENGSTP (i.e., 10 msec) is put into the engine stop delay timer TMENGSTP, which is being reset. In step S19, the variable CVTOKON is set to "10" in binary notation.

If the step S14 determines that the starting clutch is isolated, the flow proceeds to step S15 in which a decision is made as to whether the engine stop delay timer TMENGSTP is set to "0" or not. If the step S15 determines that the engine stop delay timer TMENGSTP is not "0", the flow proceeds to step S19 in which the variable CVTOKNO is set to "10" in binary notation.

If the step S15 determines that the engine stop delay timer TMENGSTP is set to "0", the flow proceeds to step S16 in which a decision is made as to whether a running speed VLVH of the vehicle is set to "0" or not. If the step S16 determines that the running speed VLVH of the vehicle is zero, the flow proceeds to step S17 in which the variable CVTOKNO is set to "11" in binary notation. If not zero, the flow proceeds to step S19 in which the variable CVTOKNO is set to "10" in binary notation. The foregoing step S4 determines that the fuel cut restoration flag F_NFCTUP is "1" at a rapid deceleration mode of the vehicle. In order to allow execution of the engine stop when the running speed VLVH of the vehicle is substantially zero, the present embodiment introduces the step 16 to make determination as to whether the running speed VLVH is set to "0" or not. However, it is possible to modify the present embodiment such that the flow proceeds from step S16 to step S17 if the running speed VLVH is under a prescribed low speed (e.g., 1 km/h), which is substantially assumed to be zero.

In a start mode of the vehicle and in the case where conditions of the vehicle do not meet prescribed engine stop conditions, the flow proceeds to step S7 in which the variable CVTOKNO is set such that execution of the engine stop is inhibited without changing the fuel-cut-restoration rotation speed of the engine. In the case where the engine stop is executed by continuing the fuel cut, the flow proceeds to step S10 in which the variable CVTOKNO is set such that execution of the engine stop is allowed without changing the fuel-cut-restoration rotation speed of the engine.

In the case where the starting clutch is not isolated in an engine stop mode in which the engine is stopped by continuing the fuel cut, the flow proceeds to step S12 in which the variable CVTOKNO is set such that execution of the engine stop is allowed without changing the fuel-cut-restoration rotation speed of the engine. In the case where the engine stop cannot be executed because the vehicle is stopped before a reduction ratio of the CVT 3 is not returned to the prescribed reduction ratio allowing the vehicle to restart, the flow proceeds to step S19 in which the variable CVTOKNO is set such that execution of the engine stop is inhibited while the engine is restored from the fuel cut by increasing the fuel-cut-restoration rotation speed of the engine. After completion of the step S19, if the reduction ratio of the CVT 3 is returned to the prescribed reduction ratio allowing the vehicle to restart so that conditions of the vehicle meet all the prescribed engine stop conditions, the flow proceeds to step S17 in which the variable CVTOKNO is set such that execution of the engine stop is allowed without changing the fuel-cut-restoration rotation speed of the engine.

The variable CVTOKNO, which is set in each of the aforementioned steps S7, S10, S12, S17 and S19, is communicated to the driving power control device 5. So, the driving power control device 5 controls the engine based on the variable CVTOKNO. The process of FIG. 2 is repeatedly executed by a certain period of time. Every time the process is executed, the variable CVTOKNO is being updated in response to the aforementioned flags.

Figure 3:
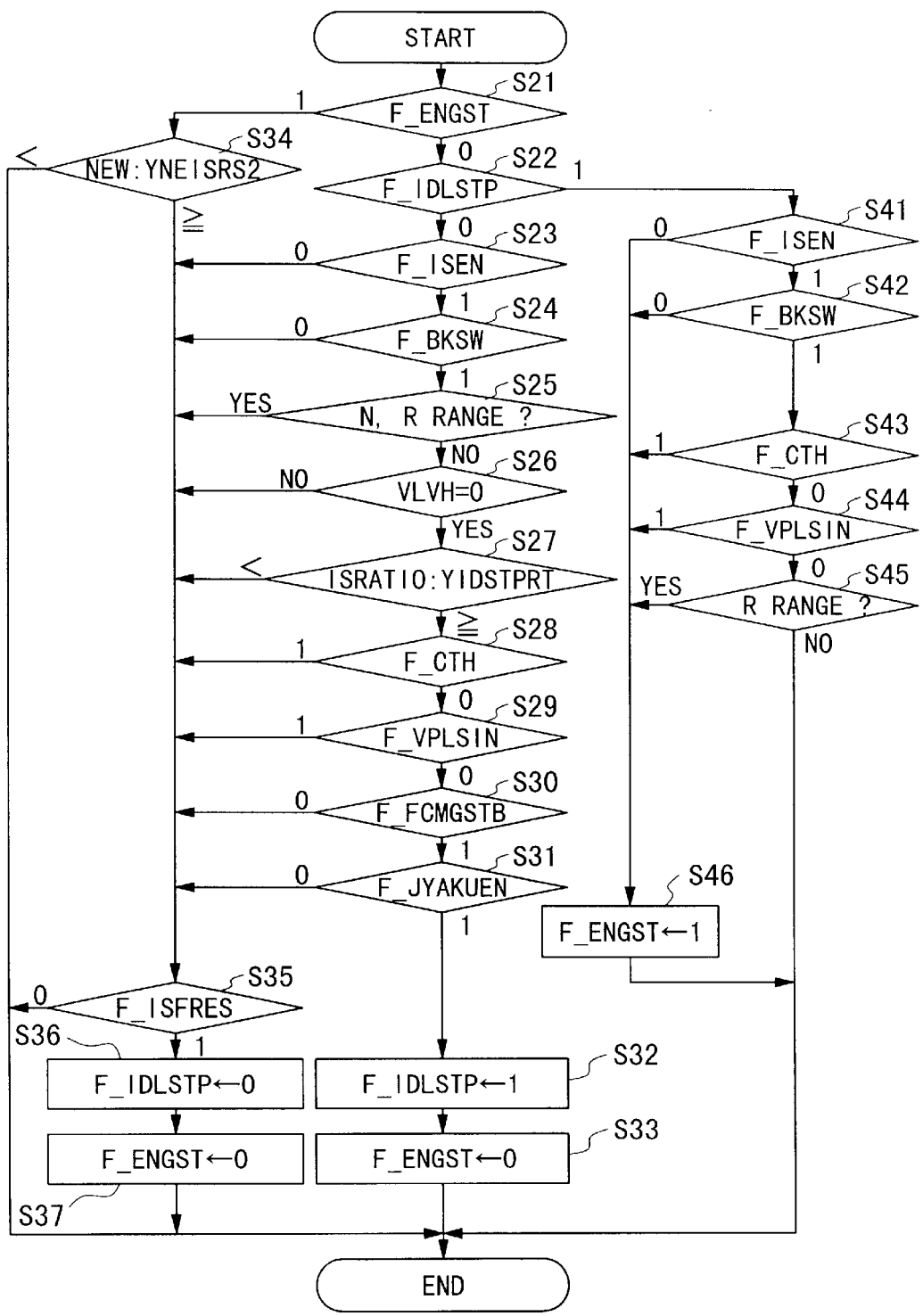
FIG. 3 is a flowchart showing a process for setting an engine start determination flag and an engine stop determination flag, which are used in the process of FIG. 2.

Next, a description will be given with respect to operations to set the foregoing engine start determination flag F_ENGST and the engine stop determination flag F_IDLSTP. FIG. 3 shows a control flow implementing the operations to set the engine start determination flag F_ENGST and engine stop determination flag F_IDLSTP by the transmission control device 6. That is, the transmission control device 6 repeatedly executes the process of FIG. 3 by a certain interval of time, which is determined based on intervals of time for updating flags and variables. For example, it is set to 10 msec.

In FIG. 3, the flow firstly proceeds to step S21 in which determination is made as to whether engine start conditions are established or not with reference to an engine start determination flag F_ENGST, which is set in this process. If the engine start conditions are not established, the engine start determination flag F_ENGST is set to "0". If the engine start conditions are established, the engine start determination flag F_ENGST is set to "1". So, if the step S21 determines that the engine start conditions are established, the flow proceeds to step S34.

If the step S21 determines that the engine start conditions are not established, the flow proceeds to step S22, which makes determination as to whether engine stop conditions are established or not with reference to an engine stop determination flag F_IDLSTP, which is set in this process. If the engine stop conditions are not established, the engine stop determination flag F_IDLSTP is set to "0". If the engine stop conditions are established, the engine stop determination flag F_IDLSTP is set to "1". So, if the step S22 determines that the engine stop conditions are established, the flow proceeds to step S41.

If the engine stop determination flag F_IDLSTP is "0", the flow proceeds to step S23, which makes determination as to whether temperature of the operating oil in the CVT 3 is equal to or above prescribed temperature or not with reference to a flag F_ISEN. If the temperature of the operating oil is equal to or above the prescribed temperature, the flag F_ISEN is set to "1". If the temperature of the operating oil does not reach the prescribed temperature, the flag F_ISEN is set to "0". So, if the step S23 determines that the temperature of the operating oil does not reach the prescribed temperature, the flow proceeds to step S35.

If the temperature of the operating oil in the CVT 3 is equal to or above the prescribed temperature, the flow proceeds to step S24 which makes determination as to whether the brake switch 7 is ON or not with reference to a flag F_BKSW. If the brake switch 7 is ON, the flag F_BKSW is set to "1". If OFF, the flag F_BKSW is set to "0". So, if the step S24 determines that the brake switch 7 is OFF, the flow proceeds to step S35.

If the step S24 determines that the brake switch 7 is ON, the flow proceeds to step S25 which makes determination as to whether the shift position of the position switch 8 corresponds to either an N range or R range or not. If the shift position corresponds to either the N range or R range, the flow proceeds to step S35.

If the step S25 determines that the shift position of the position switch 8 corresponds to a range other than the N and R ranges, the flow proceeds to step S26 in which a decision is made as to whether a running speed VLVH of the vehicle is "0" or not. If the step S26 determines that the running speed VLVH of the vehicle is not zero, the flow proceeds to step S35.

If the step S26 determines that the running speed VLVH of the vehicle is zero, the flow proceeds to step S27 which makes determination as to whether a reduction ratio ISRATIO of the CVT 3 corresponds to a restart-enable reduction ratio enabling the vehicle to restart or not. Herein, the restart-enable reduction ratio of the CVT 3 is defined as the reduction ratio that provides following merits:

(i) It is possible to provide sufficient acceleration at a start of the vehicle.

(ii) It is possible to avoid shortage of lubrication of the starting clutch and shortage of the side pressure of the pulley, and it is possible to reduce a time which the starting clutch needs to establish perfect engagement even when the vehicle starts running at the restart-enable reduction ratio of the CVT 3.

Actually, the restart-enable reduction ratio can be selected from among a range of reduction ratios between 2.2 and 2.45 with respect to the CVT 3 whose reduction ratios can be changed between 2.45 and 0.4. Concretely speaking, the step S27 makes comparison between the reduction ratio ISRATIO and a threshold reduction ratio YIDSTPRT (i.e., reduction ratio of 2.2). If the step S27 determines that the reduction ratio ISRATIO is smaller than 2.2, the flow proceeds to step S35.

If the step S27 determines that the reduction ratio of the CVT 3 corresponds to the restart-enable reduction ratio, the flow proceeds to step S28 which makes determination as to whether a throttle is full close or not with reference to a throttle full close flag F_CTH. The throttle full close flag F_CTH is set by an output of the throttle opening sensor 6S. It is set to "0" under a full close state of the throttle. It is set to "1" if the throttle is ON. So, if the step S28 determines that the throttle is ON, the flow proceeds to step S35.

Under the full close state of the throttle, the flow proceeds to step S29 which makes determination as to whether the device inputs pulses for measuring running speed of the vehicle or not with reference to a flag F_VPLSIN. If the device inputs the pulses, the flag F_VPLSIN is set to "1". If not, it is set to "0". So, if the step S29 determines that the device inputs the pulses, the flow proceeds to step S35.

If the step S29 determines that the device does not input the pulses, the flow proceeds to step S30 which makes determination as to whether preparation is completed for an engine stop or not with reference to an engine stop preparation completion flag F_FCMGSTB, which is communicated from the driving power control device 5. If the preparation is not completed, the flow proceeds to step S35.

If the step S30 determines that the preparation is completed for the engine stop, the flow proceeds to step S31 which makes determination as to whether pressure of the starting clutch is decreased to be a weak pressure caused by a dead stroke stop or not with reference to a flag F_JYAKUEN. The flag F_JYAKUEN is set to "1" when the pressure of the starting clutch is decreased to be the weak pressure of the dead stroke stop. It is set to "0" if the pressure of the starting clutch is a strong pressure. In general, substantially no shock occurs even if the engine is stopped under the weak pressure of the starting clutch. For this reason, the step S31 is used to make determination as to whether if the engine is stopped at the present timing, substantially no shock occurs or not. So, if the step S31 determines that the pressure of the starting clutch is strong, the flow proceeds to step S35.

If the step S31 determines that the pressure of the starting clutch is weak, the flow proceeds to step S32 in which a flag F_IDLSTP is set to "1" in order to indicate establishment of the engine stop conditions. In step S33, an engine start determination flag F_ENGST is set to "0". Then, the device ends the process.

Next, if the aforementioned step S21 determines that the engine start determination flag F_ENGST is "1", the flow proceeds to steps S34 to S37, which determine whether to reset the flags F_IDLSTP and F_ENGST or not. Details will be described below.

In step S34, a decision is made as to whether an engine speed NEW is equal to or above a threshold value (YNEISRS2) or not. If the engine speed NEW is lower than the threshold value, the device ends the process. If the engine speed NEW is equal to or above the threshold value, the flow proceeds to step S35 which makes determination as to whether the dead stroke stop is completed or not with reference to a flag F_ISFRES. Since the flag F_ISFRES is set to "1" if the dead stroke stop is completed, the flow proceeds to steps S36 and S37, wherein the flags F_IDLSTP and F_ENGST are both set to "0". If the dead stroke stop is not completed, the device ends the process.

Next, if the step S22 determines that the engine stop determination flag F_IDLSTP is "1", the flow proceeds to steps S41 to S46, which determine whether to restart the engine in an engine stop mode or not. Details will be described below.

In step S41, determination is made as to whether temperature of the operating oil of the CVT 3 is equal to or above the prescribed temperature or not with reference to the flag F_ISEN. If the temperature of the operating oil is equal to or above the prescribed temperature, the flag F_ISEN is set to "1". If not, it is set to "0". So, if the step S41 determines that the temperature of the operating oil does not reach the prescribed temperature, the flow proceeds directly to step S46.

If the step S41 determines that the temperature of the operating oil of the CVT 3 is equal to or above the prescribed temperature, the flow proceeds to step S42, which makes determination as to whether the brake switch 7 is ON or not with reference to the flag F_BKSW. If the brake switch 7 is ON, the flag F_BKSW is set to "1". If OFF, the flag F_BKSW is set to "0". So, if the step S42 determines that the brake switch 7 is OFF, the flow proceeds to step S46.

If the step S42 determines that the brake switch 7 is ON, the flow proceeds to step S43 which makes determination as to whether the throttle is full close or not with reference to the throttle full close flag F_CTH. As described before, the throttle full close flag F_CTH is set by an output of the throttle opening sensor 6S. Under the full close state of the throttle, the flag F_CTH is set to "0". If the throttle is ON, it is set to "1". So, if the step S43 determines that the throttle is ON, the flow proceeds to step S46.

If the step S43 determines that the throttle is full close, the flow proceeds to step S44 which makes determination as to whether the device inputs pulses for measuring running speed of the vehicle or not with reference to the flag F_VPLSIN. If the device inputs the pulses, the flag F_VPLSIN is set to "1". If not, it is set to "0". Therefore, if the device inputs the pulses to detect that the vehicle starts moving, the flow proceeds to step S46.

If the step S44 determines that the device does not input the pulses, the flow proceeds to step S45 which makes determination as to whether the shift position of the position switch 8 corresponds to the R range or not. If the shift position does not correspond to the R range, the device ends the process.

If the shift position of the position switch 8 corresponds to the R range, the flow proceeds to step S46 in which the engine start determination flag F_ENGST is set to "1". Then, the device ends the process.

As described above, the engine stop determination flag F_IDLSTP is set to "1" in step S32, or it is reset to "0" in step S36. In addition, the engine start determination flag F_ENGST is reset to "0" in step S33 or S37, or it is set to "1" in step S46. The process of FIG. 3 is repeatedly executed by the prescribed interval of time. Every time the process of FIG. 3 is executed, the engine start determination flag F_ENGST and engine stop determination flag F_IDLSTP are updated based on the aforementioned flags.

Figure 4:
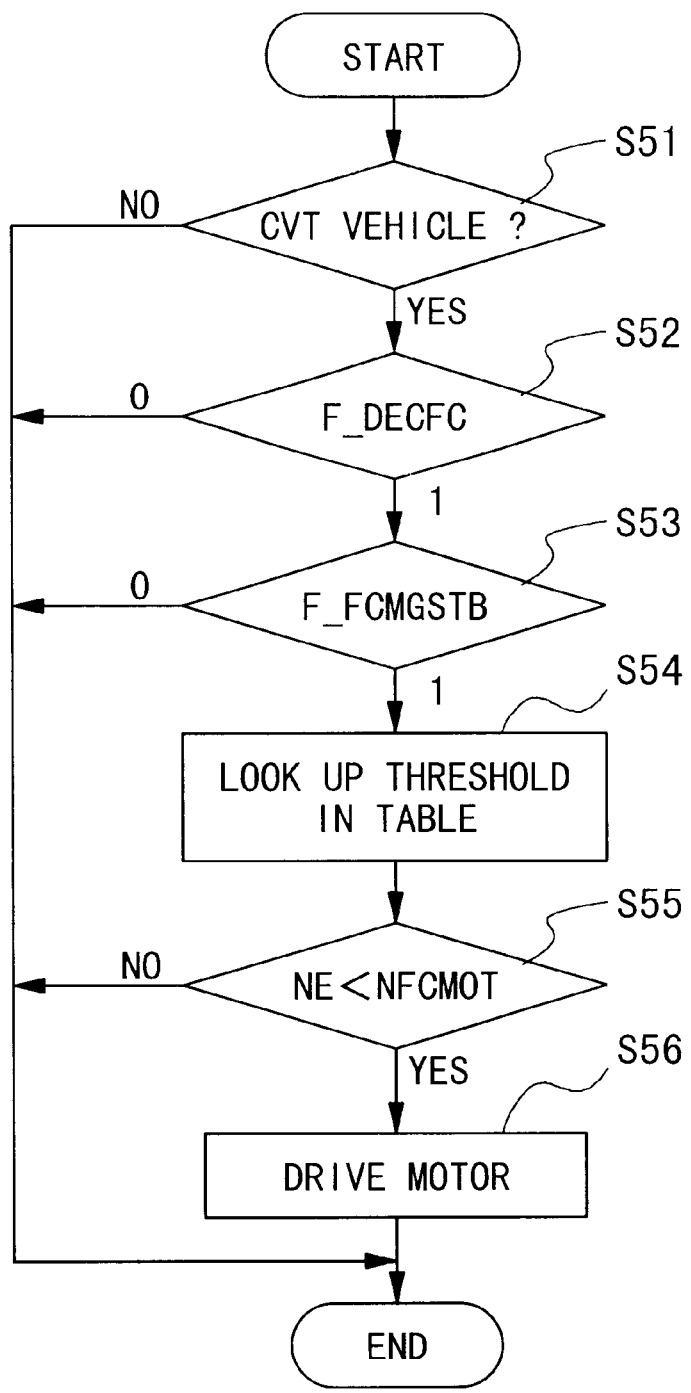
FIG. 4 is a flowchart showing an idle rotation maintaining operation of the engine whose rotation is assisted by the motor.
Figure 6:
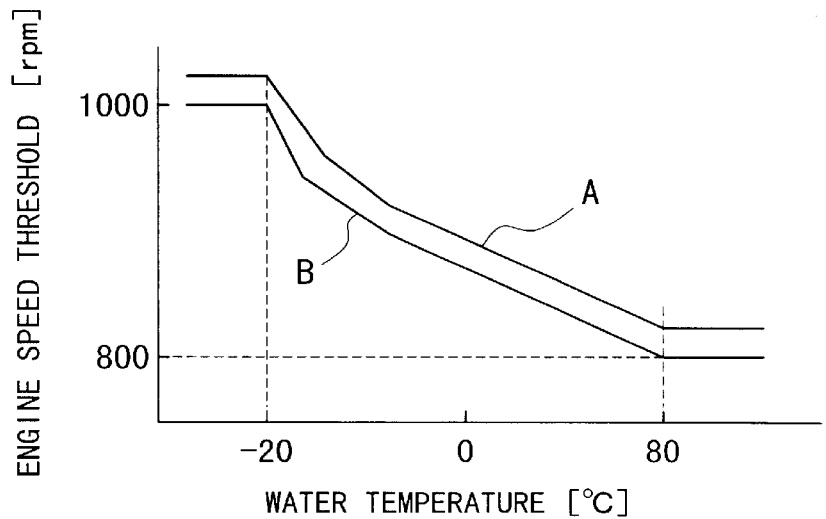
FIG. 6 is a graph showing content of an engine speed threshold table storing thresholds of engine speeds in connection with engine water temperature.
Figure 7:
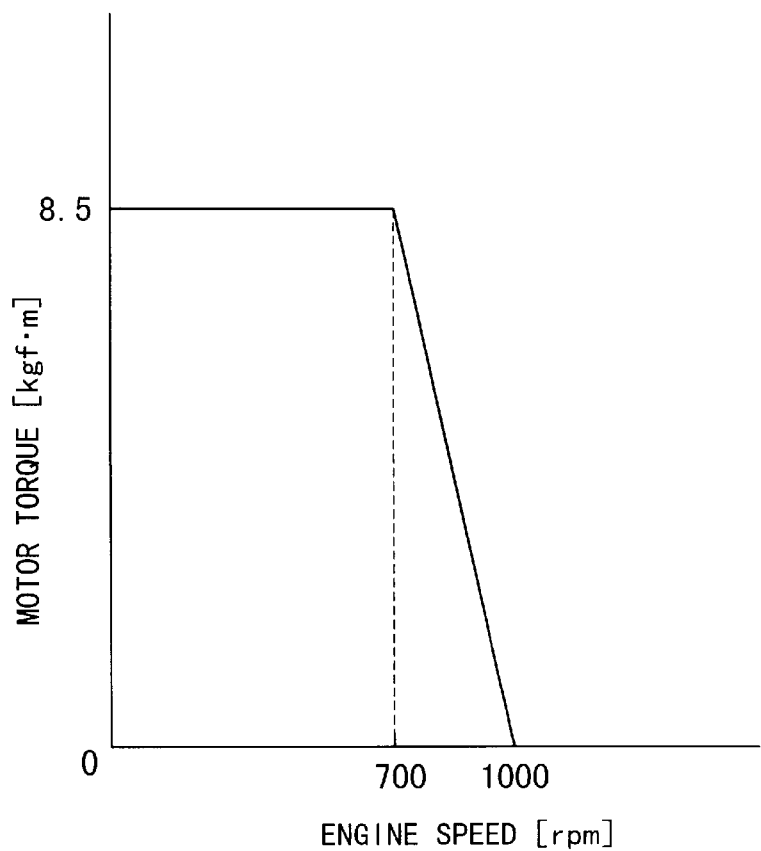
FIG. 7 is a graph showing variations of motor torque, which is varied in response to engine speed by rotation control of the motor.

With reference to FIGS. 4, 6 and 7, a description will be given with respect to idle rotation maintaining operation in which the motor control device 4 and driving power control device 5 control rotation of the motor 2 so that idle rotation of the engine 1 is maintained until the CVT 3 is placed in a start-enable reduction ratio (or restart-enable reduction ratio) enabling a start of the vehicle. The idle rotation maintaining operation is activated when fuel cut is effected at a deceleration mode and the CVT 3 is not placed in the restart-enabling reduction ratio, wherein the idle rotation of the engine 1 is maintained by the motor 2. Herein, the restart-enable reduction ratio of the CVT 3 is defined as the reduction ratio that provides following merits:

(i) It is possible to provide sufficient acceleration at a start of the vehicle.

(ii) It is possible to avoid shortage of lubrication of the starting clutch and shortage of the side pressure of the pulley, and it is possible to reduce a time which the starting clutch needs to establish perfect engagement even when the vehicle starts running at the restart-enable reduction ratio of the CVT 3.

Actually, the restart-enable reduction ratio is set in a range between 2.2 and 2.45 with respect to the CVT 3 whose reduction ratio can be changed within a range between 2.45 and 0.4.

FIG. 4 shows a control flow of a process with regard to the idle rotation maintaining operation of the engine 1 being assisted by the motor 2. First, the flow proceeds to step S51 which makes determination as to whether the vehicle is equipped with a CVT or not. If the step S51 determines that the vehicle is not equipped with the CVT, the device ends the process of FIG. 4 without performing control of the motor 2.

If the step S51 determines that the vehicle is equipped with the CVT, the flow proceeds to step S52 which makes determination as to whether fuel cut is presently effected or not with reference to a flag F_DECFC, which indicates whether to effect the fuel cut or not. If the fuel cut is presently effected, the flag F_DECFC is set to "1". If not, it is set to "0". So, if the step S52 determines that the fuel cut is not presently effected, the device ends the process without performing control of the motor 2.

If the step S52 determines that the fuel cut is presently effected, the flow proceeds to step S53 which makes determination as to whether preparation is completed for an engine stop or not with reference to an engine stop preparation completion flag F_FCMGSTB. So, if the step S53 determines that preparation is not completed for the engine stop (namely, F_FCMGSTB=0), the device ends the process without performing control of the motor 2.

If the step S53 determines that preparation is completed for the engine stop, the flow proceeds to step S54 to look up an engine speed threshold table, which stores relationships between engine water temperature and engine speed as shown in FIG. 6. In FIG. 6, solid curves A, B show thresholds of the engine speed in connection with the engine water temperature. Namely, the curve A represents upper-limit values in the thresholds of the engine speed, while the curve B represents lower-limit values in the thresholds of the engine speed. Thus, the present embodiment brings a hysteresis characteristic in the thresholds of the engine speed. With reference to the table, it is possible to read thresholds of the engine speed in connection with the engine water temperature at the present timing.

In step S54, it is possible to read a certain engine speed threshold NFCMOT. In step S55, comparison is made between the engine speed threshold NFCMOT and engine speed NE, which is produced by the engine speed sensor S1. If the engine speed NE is greater than the engine speed threshold NFCMOT, the device ends the process without performing control of the motor 2.

If the engine speed NE is smaller than the engine speed threshold NFCMOT, the flow proceeds to step S56 in which the motor 2 is driven to assist rotation of the engine 1. Thus, it is possible to maintain the idle rotation of the engine 1 even if the fuel cut is continued. Maintaining the idle rotation of the engine 1, it is possible to secure hydraulic pressure used for controlling the CVT 3. As a result, it is possible to place the CVT 3 in the restart-enable reduction ratio.

Next, a description will be given with respect to a rotation control of the motor 2 which is driven to assist rotation of the engine 1 in the step S56. FIG. 7 shows a relationship between motor torque and engine speed when the motor 2 is driven to assist rotation of the engine 1 in the step S56. Herein, the motor 2 is driven such that the motor torque is varied in response to engine speed of the engine 1. FIG. 7 shows that the motor torque is set at 0[kgf-m] in response to the engine speed of 1000 [rpm], and the motor torque is gradually increased in response to decrease of the engine speed, then, the motor torque reaches 8.5 [kgf-m] in response to the engine speed of 700 [rpm]. Namely, the motor 2 is driven in accordance with the relationship of FIG. 7 such that the motor torque is maintained at 8.5 [kgf-m] in a range of the engine speed between 0 and 700 [rpm], then, the motor torque is gradually decreased to zero in a range of the engine speed between 700 and 1000 [rpm]. The aforementioned rotation control of the motor 2 is terminated when the CVT 3 is returned to the restart-enable reduction ratio, in other words, when the aforementioned variable CVTOKNO indicates permission for execution of the engine stop. By effecting the rotation control of the motor 2 to actualize variations of the motor torque shown in FIG. 7, it is possible to maintain the engine speed of the engine 1 at 900 [rpm].

As described above, the rotation control is effected on the motor 2 such that the motor torque is gradually increased in response to decrease of the engine speed in the specific range of engine speed. This eliminates a driver's feeling of wrongness when the motor 2 is driven to produce motor torque assisting rotation of the engine 1. Since the idle rotation of the engine 1 can be maintained while fuel cut is continued, it is possible to wait for a moment of time by which the CVT 3 is placed in the restart-enable reduction ratio without consuming fuel, then, the engine stop is being executed.

Variations of the motor torque shown in FIG. 7 are determined to maintain idle rotation speed of the engine 1. Herein, engine speed of the engine 1 at which the motor 2 starts rotation or at which the motor torque is increased from zero is set to be higher than the idle rotation speed of the engine 1. In addition, the motor torque is maintained at a constant value, which is determined to maintain the idle rotation speed of the engine 1 even if actual engine speed becomes lower than the idle rotation speed. As shown in FIG. 7, the motor torque is linearly varied from zero to the constant value (i.g., 8.5 kgf-m). Thus, even when the motor 2 is activated to produce motor torque during execution of the fuel cut, it is possible to maintain the idle rotation speed of the engine without causing a feeling of wrongness for the driver.

Figure 5:
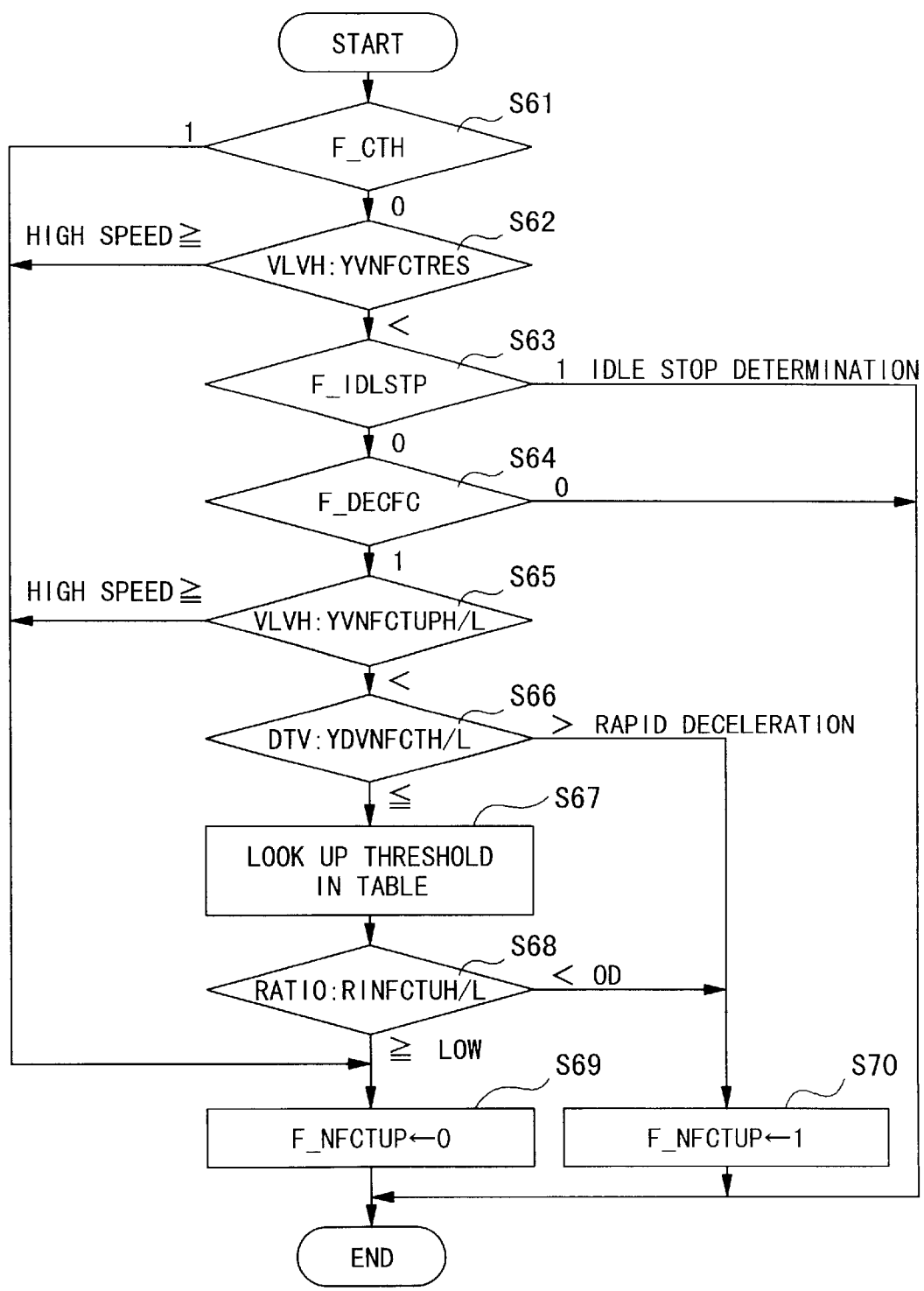
FIG. 5 is a flowchart showing operations for setting and resetting a fuel-cut-restoration request flag used in FIG. 2.
Figure 8:
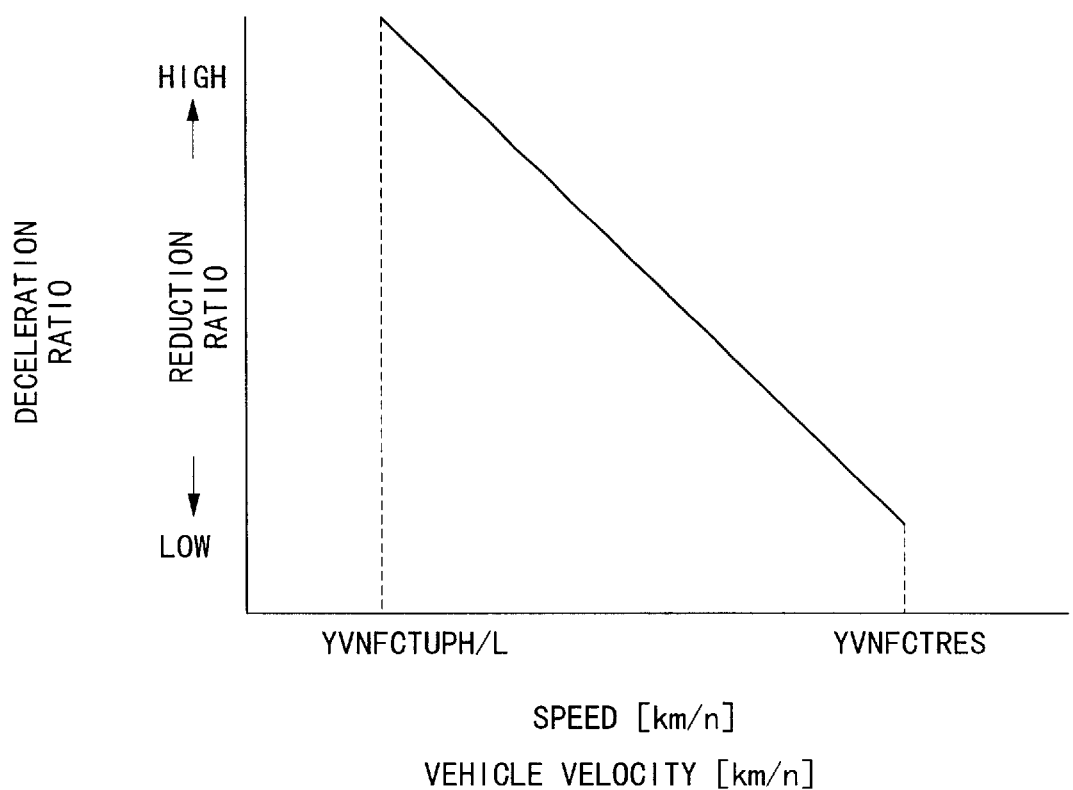
FIG. 8 is a graph showing content of a reduction ratio threshold table, which is referred in FIG. 5.

With reference to FIGS. 5 and 8, a description will be given with respect to postponement operation for postponing execution of an engine stop until the CVT 3 is placed in a restart-enable state. FIG. 5 shows a control flow for a process of setting a fuel cut restoration request flag F_NFCTUP, which is referred in the foregoing step S4 of FIG. 2. If the fuel cut restoration request flag F_NFCTUP is set to "1", fuel-cut-restoration rotation speed by which the engine is restored from the fuel cut at a deceleration mode is increased high. Using such high fuel-cut-restoration rotation speed, the device controls the engine 1 to restart. Herein, restoration from the fuel cut indicates restart of fuel injection. Due to the fuel cut of the engine of the vehicle at the deceleration mode, running speed of the vehicle is considerably decreased. Setting the fuel-cut-restoration rotation speed high, it is possible to restore the engine from the fuel cut before the engine speed becomes extremely low.

Incidentally, the CVT 3 employs the restart-enable reduction ratio, which belongs to a range of reduction ratios between 2.2 and 2.45.

The transmission control device 6 repeatedly executes the process of FIG. 5 by a certain interval of time, which is determined based on times being required for updating flags used in the process of FIG. 5. For example, it is set at 10 msec.

When the device starts the process of FIG. 5, the flow firstly proceeds to step S61 which makes determination as to whether the throttle is full close or not with reference to a throttle full close flag F_CTH. The throttle full close flag F_CTH is set in response to an output of the throttle opening sensor 6S. Under the full close state of the throttle, the flag CTH is set to "0". If the throttle is ON, it is set to "1". If the step S61 determines that the throttle is ON, the flow proceeds to step S69 in which the fuel-cut-restoration request flag FNFCTUP is set to "0".

If the step S61 determines that the throttle is full close, the flow proceeds to step S62 which makes comparison between running speed VLVH of the vehicle and fuel-cut-restoration reset speed YVNFCTRES. If the step S62 determines that the running speed VLVH is equal to or higher than the fuel-cut-restoration reset speed YVNFCTRES, the flow proceeds to step S69 in which the fuel-cut-restoration request flag F_NFCTUP is set to "0". Herein, the fuel-cut-restoration reset speed YVNFCTRES is a threshold value by which following steps S63–S68 are excluded when the vehicle runs at such a high speed which does not require restoration from the fuel cut. For this reason, the fuel-cut-restoration reset speed YVNFCTRES is set to a value of running speed of the vehicle in which the throttle is full close and the CVT 3 has a sufficient time to return the reduction ratio thereof to the restart-enable reduction ratio before execution of an engine stop.

If the step S62 determines that the running speed VLVH is lower than the fuel-cut-restoration reset speed YVNFCTRES, the flow proceeds to step S63 which makes determination as to whether an engine stop is presently executed or not with reference to an engine stop determination flag F_IDLSTP. The engine stop determination flag F_IDLSTP is set by the step S32 and reset by the step S36 shown in FIG. 3. That is, if the engine stop is executed, the flag F_IDLSTP is set to "1". If not, it is set to "0". So, if the step S63 determines that the engine stop has been already executed, the device ends the process.

If the step S63 determines that the engine stop is not executed, the flow proceeds to step S64 which makes determination as to whether the fuel cut is presently performed or not with reference to a fuel cut determination flag F_DECFC. If the fuel cut is presently performed, the fuel cut determination flag F_DECFC is set to "1". If not, it is set to "0". So, if the step S64 determines that the fuel cut is not performed, the device ends the process.

If the step S64 determines that the fuel cut is presently performed, the flow proceeds to step S65 which makes comparison between the present running speed VLVH of the vehicle and fuel-cut-restoration speed YVNFCTUPH/L. The fuel-cut-restoration speed YVNFCTUPH/L is a threshold value having a hysteresis characteristic and is set to a value of running speed from which the vehicle is rapidly decelerated and is stopped before the CVT 3 returns the reduction ratio to the restart-enable reduction ratio. For example, the fuel-cut-restoration speed YVNFCTUPH/L is set at 20 km/h. So, if the step S65 determines that the running speed VLVH is equal to or higher than the fuel-cut-restoration speed YVNFCTUPH/L, the flow proceeds directly to step S69 in which the fuel-cut-restoration request flag F_NFCTUP is set to "0".

If the step S65 determines that the running speed VLVH is lower than the fuel-cut-restoration speed YVNFCTUPH/L, the flow proceeds to step S66 which makes comparison between deceleration DTV of the vehicle and fuel-cut-restoration deceleration YDVNFCTUPH/L. The deceleration DTV corresponds to acceleration having a negative value which is calculated based on variations of an output of the speed sensor 4S. Herein, a high value of the deceleration DTV indicates rapid deceleration in sudden braking, for example. The fuel-cut-restoration deceleration YDVNFCTUPH/L depends upon a capability of the CVT 3 for changing its reduction ratio. In the case of the CVT which is capable of speedily changing the reduction ratio, it is possible to increase the deceleration, namely, fuel-cut-restoration deceleration YDVNFCTUPH/L. For example, the fuel-cut-restoration deceleration YDVNFCTUPH/L is set at −0.5G.

If the vehicle performs rapid deceleration, in other words, if the step S66 determines that the deceleration DTV is greater than the fuel-cut-restoration deceleration YDVNFCTUPH/L, the flow proceeds to step S70 in which the fuel-cut-restoration request flag F_NFCTUP is set to "1". Thus, the fuel-cut-restoration engine speed is set to be higher than the engine speed presently set, so it is possible to prevent the engine 1 from being unintentionally stopped due to extremely rapid deceleration even when the engine is restored from the fuel cut. In addition, it is possible to prevent the vehicle from being stopped before the CVT 3 returns the reduction ratio to the restart-enable reduction ratio.

If the vehicle does not perform the rapid deceleration, in other words, if the step S66 determines that the deceleration DTV is under the fuel-cut-restoration deceleration YDVNFCTUPH/L, the flow proceeds to step S67 in which the device retrieves thresholds values of the fuel-cut-restoration reduction ratio from a reduction ratio threshold table (not shown). Content of the reduction ratio threshold table is shown in FIG. 8, which shows linear variations of a fuel-cut-restoration reduction ratio RTNFCTUH/L being determined in advance with respect to a specific range of running speed between the fuel-cut-restoration speed YVNFCTUPH/L and the fuel-cut-restoration reset speed YVNFCTRES. Namely, the fuel-cut-restoration reduction ratio RTNFCTUH/L defines a reduction ratio per each speed value of the vehicle, which has a high probability in that the CVT 3 cannot return to the restart-enable reduction ratio before a stop of the vehicle which makes deceleration at a present running speed.

In step S67, the device reads a certain threshold value of the fuel-cut-restoration reduction ratio RTNFCTUHIL from the table in response to the present running speed of the vehicle. In step S68, comparison is made between the fuel-cut-restoration deceleration RTNFCTUH/L and a present reduction ratio RATIO of the CVT 3. The reduction ratio RATIO of the CVT 3 is calculated from an output of the engine speed sensor IS and an output of the output shaft rotation speed sensor 3S. If the step S68 determines that the present reduction ratio RATIO of the CVT 3 is lower than the fuel-cut-restoration reduction ratio RTNFCTUH/L, the flow proceeds to step S70 in which the fuel-cut-restoration request flag F_NFCTUP is set to "1". Thus, the vehicle which decelerates in a fuel cut mode is restored to restart fuel injection at an early timing.

If the step S68 determines that the present reduction ratio RATIO of the CVT 3 is equal to or higher than the fuel-cut-restoration reduction ratio RTNFCTUH/L, the flow proceeds to step S69 in which the fuel-cut-restoration request flag F_NFCTUP is set to "0". Herein, the vehicle continues the fuel cut without changing the fuel-cut-restoration engine speed.

As described above, the fuel-cut-restoration engine speed being set to the engine which is restored from the fuel cut at a deceleration mode is adequately changed in response to statuses of the vehicle such as running speed, deceleration and reduction ratio. Thus, it is possible to return the CVT 3 to the restart-enable reduction ratio before an engine stop is executed.

In addition, execution of the engine stop is postponed until the CVT 3 is returned to the restart-enable reduction ratio. For this reason, the vehicle does not restart after the engine stop with an unnecessarily low reduction ratio of the CVT 3. In other words, the vehicle can restart with the appropriately selected restart-enable reduction ratio of the CVT 3, so it is possible to produce optimal acceleration. Since the CVT 3 is returned to the restart-enable reduction ratio before an engine stop, the vehicle is capable of smoothly restarting by using hydraulic pressure of the CVT 3 exclusively for restarting. Thus, it is possible to avoid drawbacks such as the belt slip due to shortage of lubrication of the starting clutch and shortage of side pressure of the pulley.

The present embodiment is described with respect to the hybrid vehicle which installs the motor 2 being coupled between the engine 1 and the CVT 3. This invention is not necessarily limited in application to the hybrid vehicles. Hence, this invention is applicable to other types of vehicles such as a vehicle equipped with an engine and a CVT. So, the aforementioned technical features of this invention can be smoothly applied to such a vehicle which effects fuel cut on the engine at a deceleration mode. Incidentally, it is possible to employ any types of the CVTs, each of which is designed to operate by using hydraulic pressure being produced by the engine.

If the vehicle employs an automatic transmission that is placed in desired conditions other than a desired reduction ratio at starting, it is possible to modify the present embodiment such that an engine stop is executed after confirmation of establishment of the desired conditions of the automatic transmission.

A control mechanism of the vehicle of the present embodiment is partitioned into three types of control devices, namely, the driving power control device 5, transmission control device 6 and motor control device 4 shown in FIG. 1. It is not necessarily partitioned into multiple control devices, hence, it can be integrated as one control device. In addition, it is possible to modify the present embodiment such that different control devices are respectively provided with respect to the processes of FIGS. 2, 3, 4 and 5 to be executed independently. In that case, flags are communicated between the control devices. In short, the control device(s) is configured to secure independent execution of the processes of FIGS. 2, 3, 4 and 5, which perform mutual reference of flags and sensor outputs therebetween, so that the engine, motor and transmission are respectively controlled based on the flags and sensor outputs.

Lastly, this invention has a variety of technical features and effects, which are summarized as follows:

(1) In the case of a vehicle installing an engine coupled to an automatic transmission, an engine control apparatus allows execution of an engine stop by detecting that an automatic transmission is returned to a restart-enable reduction ratio at a deceleration mode of a vehicle. So, it is possible to prevent the engine stop from being executed before the automatic transmission is returned to the restart-enable reduction ratio.

(2) In the case of a hybrid vehicle installing a motor and an engine coupled to an automatic transmission (e.g., CVT), an engine control apparatus maintains idle rotation of the engine by operating the motor to rotate in response to engine speed under execution of fuel cut at a deceleration mode until the automatic transmission is returned to a restart-enable reduction ratio. Hence, it is possible to prevent an engine stop from being executed before the automatic transmission is returned to the restart-enable reduction ratio under execution of the fuel cut at the deceleration mode. Therefore, the vehicle does not restart after the engine stop with an extremely low reduction ratio of the automatic transmission, so it is possible to produce appropriate acceleration. Since the automatic transmission has been already returned to the restart-enable reduction ratio before restarting, it is possible to use hydraulic pressure of the automatic transmission exclusively for the restarting of the vehicle. Thus, it is possible to avoid occurrence of belt slip being caused due to shortage of lubrication of a starting clutch and shortage of side pressure of a pulley.

(3) In order to maintain the idle rotation of the engine, the engine control apparatus controls the motor to increase motor torque in response to decrease of the engine speed. Thus, it is possible to eliminate a feeling of wrongness for the driver when the motor torque is produced.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. An engine control apparatus for a vehicle in which wheels are driven by driving power being produced by an engine and transmitted by way of an automatic transmission, said engine control apparatus comprising:

an engine stop/restart device that stops or restarts the engine in response to prescribed drive conditions of the vehicle;

a fuel cut device that cuts off fuel supply to the engine at a deceleration mode of the vehicle; and a detection device that detects that the automatic transmission returns a reduction ratio thereof to a restart-enable reduction ratio, so that the engine stop/restart device allows execution of an engine stop.

2. An engine control apparatus for a hybrid vehicle which uses an engine and a motor as driving power sources for driving wheels, comprising:

an engine stop/restart device that stops or restarts the engine in response to prescribed drive conditions of the hybrid vehicle;

a fuel cut device that cuts off fuel supply to the engine at a deceleration mode of the hybrid vehicle;

an engine speed detection device that detects engine speed of the engine;

a reduction ratio detection device that detects a reduction ratio of an automatic transmission; and a motor control device that maintains an idle rotation speed of the engine by operating the motor to rotate in response to the engine speed under execution of fuel cut at the deceleration mode until the automatic transmission returns the reduction ratio thereof to a restart-enable reduction ratio.

3. An engine control apparatus according to claim 2 wherein the motor control device controls the motor to increase motor torque in response to decrease of the engine speed.

4. An engine control method for a vehicle in which wheels are driven by driving power being produced by an engine and transmitted by way of an automatic transmission, said engine control method comprising the steps of:

automatically stopping or restarting the engine in response to prescribed drive conditions of the vehicle;

cutting off fuel supply to the engine at a deceleration mode of the vehicle; and detecting that the automatic transmission returns a reduction ratio thereof to a restart-enable reduction ratio, thus allowing execution of an engine stop.

5. An engine control method for a hybrid vehicle which uses an engine and a motor as driving power sources for driving wheels, comprising the steps of:

automatically stopping or restarting the engine in response to prescribed drive conditions of the hybrid vehicle;

cutting off fuel supply to the engine at a deceleration mode of the hybrid vehicle;

detecting engine speed of the engine;

detecting a reduction ratio of an automatic transmission; and maintaining an idle rotation speed of the engine by operating the motor to rotate in response to the engine speed under execution of fuel cut at the deceleration mode until the automatic transmission returns the reduction ratio thereof to a restart-enable reduction ratio.

* * * * *